(12) United States Patent
Han et al.

(10) Patent No.: US 8,465,869 B2
(45) Date of Patent: Jun. 18, 2013

(54) RECHARGEABLE BATTERY

(75) Inventors: Dae-Won Han, Suwon-si (KR);
Yong-Sam Kim, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 461 days.

(21) Appl. No.: 12/654,557

(22) Filed: Dec. 23, 2009

(65) Prior Publication Data
US 2010/0167120 A1 Jul. 1, 2010

(30) Foreign Application Priority Data
Dec. 26, 2008 (KR) .................. 10-2008-0134829

(51) Int. Cl.
*H01M 10/40* (2006.01)
*H01M 10/02* (2006.01)

(52) U.S. Cl.
USPC .............................. 429/164; 429/94; 429/163

(58) Field of Classification Search
None
See application file for complete search history.

(56) References Cited

U.S. PATENT DOCUMENTS

| 7,879,484 B2* | 2/2011 | Hyung et al. | 429/122 |
| 7,919,206 B2* | 4/2011 | Lee | 429/164 |
| 2007/0269711 A1* | 11/2007 | Meguro et al. | 429/94 |

FOREIGN PATENT DOCUMENTS

| JP | 09-180698 A | 7/1997 |
| JP | 2002-042854 A | 2/2002 |
| JP | 2007-188855 A | 7/2007 |
| KR | 10-2008-0010576 A | 1/2008 |
| KR | 10-2008-0028583 A | 4/2008 |

* cited by examiner

Primary Examiner — John S Maples
(74) Attorney, Agent, or Firm — Lee & Morse, P.C.

(57) ABSTRACT

A rechargeable battery including an electrode assembly having an inner surface and including a positive electrode, a negative electrode, and a separator interposed therebetween, a case having a space for internally housing the electrode assembly, a cap assembly coupled to the case and electrically connected to the electrode assembly, and a core inside the electrode assembly, wherein the core has a length and includes a plurality of support portions contacting the inner surface of the electrode assembly, and a plurality of avoidance surfaces between the support portions and separated from the inner surface of the electrode assembly.

14 Claims, 10 Drawing Sheets

RECHARGEABLE BATTERY

This application claims priority from Korean 10-2008-0134829, filed 26 Dec. 2008.

BACKGROUND OF THE INVENTION

1. Field of the Invention

Embodiments relate to a rechargeable battery. More particularly, embodiments relate to a rechargeable battery having an improved core structure.

2. Description of the Related Art

A rechargeable battery is capable of being repeatedly charged and discharged, unlike a primary battery. A low-capacity single cell rechargeable battery may generally be used for a portable small electronic device, e.g., a mobile phone, a laptop computer, or a camcorder. A large capacity rechargeable battery may be formed of a plurality of cells connected in a pack. The large capacity rechargeable battery has been widely used for a power source for, e.g., driving a motor of a hybrid electric vehicle.

Rechargeable batteries have been manufactured in various shapes, e.g., a cylindrical shape and a rectangular shape. A plurality of such rechargeable batteries may be coupled in series so as to form a large capacity rechargeable battery module to be used to, e.g., drive a motor of an electric vehicle that requires large power.

The rechargeable battery may include an electrode assembly having a positive electrode, a negative electrode and a separator therebetween, a case for housing the electrode assembly and a cap assembly for closing and sealing the case.

The positive electrode and the negative electrode may form a band shape extending in one direction, and an uncoated region may be formed at one end of the positive electrode and the negative electrode along their lengths. The positive electrode uncoated region and the negative electrode uncoated region may be disposed in different directions.

A negative electrode current collecting plate may be coupled to the negative electrode uncoated region, and a positive electrode current collecting plate may be coupled to the positive electrode uncoated region. The positive electrode current collecting plate may be electrically connected to the cap assembly to provide an external current path.

Since a rechargeable battery may be repeatedly charged and discharged, the electrode assembly may expand and contract repeatedly, such that charge and discharge efficiencies may be deteriorated, thereby reducing the output of the rechargeable battery. Also, life-span may decrease and an unstable reaction may occur. Accordingly, overall life-span of the rechargeable battery may be reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments are therefore directed to a rechargeable battery, which substantially overcomes the problems due to the limitations and disadvantages of the related art.

It is therefore a feature of an embodiment to provide a rechargeable battery having a structure that minimizes stress between an electrode assembly and a core.

It is therefore another feature of an embodiment to provide a rechargeable battery having an improved output and lifespan.

At least one of the above and other features and advantages may be realized by providing a rechargeable battery, including an electrode assembly having an inner surface and including a positive electrode, a negative electrode, and a separator interposed therebetween, a case having a space for internally housing the electrode assembly, a cap assembly coupled to the case and electrically connected to the electrode assembly, and a core inside the electrode assembly. The core may have a length and include a plurality of support portions contacting the inner surface of the electrode assembly, and may have a plurality of avoidance surfaces between the support portions and separated from the inner surface of the electrode assembly.

The rechargeable battery may further include a buffer space between the avoidance surfaces and the inner surface of the electrode assembly.

The core may include a hollow portion penetrating the core along its length.

The core may have a polygonal pillar shape.

The core may have outer edges and surfaces between the outer edges, the support portions may include the outer edges of the core and the avoidance surfaces may include the surfaces between the outer edges.

The avoidance surfaces may be planar.

The support portions may include a curved surface in contact with the inner surface of the electrode assembly.

The avoidance surfaces may include a curved surface curved away from the inner surface of the electrode assembly.

The support portions may be at ends of the core, the avoidance surfaces may include recess portions and the recess portions may be disposed along the length of the core between the support portions.

The core may include a center axis and a distance from the center axis of the core to the recess portions may be shorter than a distance from the center axis of the core to the support portions.

The core may have a center axis, and a distance from the recess portions to the center of the core and a distance between the recess portions may decrease from an end of one of the recess portions toward a center of the recess portion.

The avoidance surfaces may include a hole extending along a length of the core.

The core may have two ends, support portions may be disposed at the ends of the core, and a hole may extend between along the length of the core the support portions.

The core may have two ends and large cross-section members having a large horizontal cross-section at both ends of the core, and an elastic deforming member having a horizontal cross-section smaller than the horizontal cross-section of the large cross-section members extending along the length of the core between the large cross-section members.

The electrode assembly may have a spiral shape.

The case may have a cylinder shape.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION OF THE INVENTION

Figure 1:
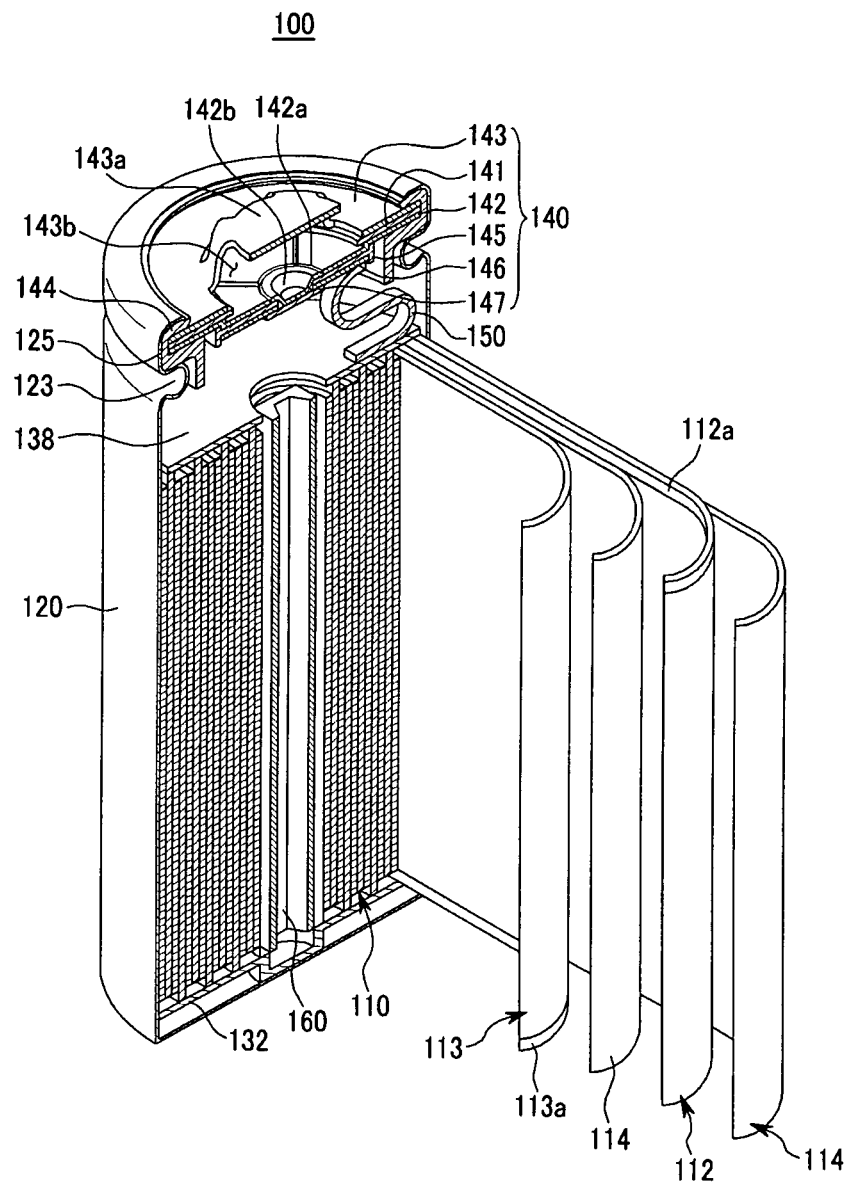
FIG. 1 illustrates an exploded perspective view of a rechargeable battery according to an embodiment.

Korean Patent Application No. 10-2008-0134829, filed on Dec. 26, 2008, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a metal" may represent a single compound, e.g., aluminum, or multiple compounds in combination, e.g., aluminum mixed with nickel.

FIG. 1 illustrates an exploded perspective view of a rechargeable battery according to an embodiment. Referring to FIG. 1, a rechargeable battery 100 according to an embodiment may include an electrode assembly 110 having a positive electrode 112, a negative electrode 113 and a separator 114 interposed therebetween, and having a case 120 having an opening at one end thereof for housing the electrode assembly 110 along with an electrolyte solution. A cap assembly 140 for closing and sealing the case 120 may be disposed at the opening of the case 120 with a gasket 144 therebetween.

The case 120 may include conductive metal, e.g., aluminum, aluminum alloy or nickel-plated steel. The case 120 may be formed in a cylindrical shape having an internal space for housing the electrode assembly 110. After inserting the cap assembly 140 into the case 120, the cap assembly 140 may be fixed in the case 120 by clamping. During clamping, a binding member 123 and a clamping member 125 may be formed in the case.

The electrode assembly 110 may be formed in a cylindrical shape by winding the positive electrode 112, the separator 114 and the negative electrode 113 in a spiral shape after stacking the positive electrode 112, the separator 114 and the negative electrode 113. However, the structure of the electrode assembly 110 is not limited thereto. The electrode assembly 110 may be formed in other shapes, e.g., a rectangular shape. The electrode assembly 110 may include a space at the center thereof, and a core 160 may be disposed in the space to maintain the shape of the center of the electrode assembly 110.

A positive electrode uncoated region 112a may be formed at a top end of the positive electrode 112, and may not be coated with positive electrode active material. The positive electrode uncoated region 112a may be electrically connected to a positive electrode current collecting plate 138. A negative electrode uncoated region 113a may be formed at a bottom end of the negative electrode 113, and may not be coated with negative electrode active material. The negative electrode uncoated region 113a may be electrically connected to a negative electrode current collecting plate 132.

The negative electrode 113 may include a current collector made of, e.g., copper or aluminum, coated with negative electrode active material. The positive electrode 112 may include a current collector made of, e.g., aluminum, coated with positive electrode active material.

The negative electrode active material may include, e.g., carbon-based active material, silicon-based active material or titanium-based active material. The positive electrode active material may include, e.g., carbon-based active material, nickel-based active material, manganese-based active material, cobalt-based active material, ternary-based active material or olivine-based active material.

Although the positive electrode current collecting plate 138 may be disposed at an upper part, and the negative electrode current collecting plate 132 may be disposed at a lower part in an embodiment, the embodiments are not limited thereto. The positive electrode current collecting plate 138 may be disposed at the lower part and the negative electrode current collecting plate 132 may be disposed at the upper part.

The cap assembly 140 may include a cap upper 143 and a vent plate 142. The cap upper 143 may include a protruding outer terminal 143a and a vent 143b. The vent plate 142 may include a notch 142a disposed under the cap upper 143. The notch 142a may break at a predetermined pressure in order to discharge excessive gas pressure. The vent plate 142 may also interrupt an electric connection of the electrode assembly 110 and the cap upper 143 at the predetermined pressure.

A positive temperature coefficient element 141 may be disposed between the cap upper 143 and the vent plate 142. The positive temperature coefficient element 141 may increase electrical resistance thereof infinitely if it exceeds a predetermined temperature. Thus, if the rechargeable battery 100 reaches a temperature higher than a predetermined value, the positive temperature coefficient element 141 may interrupt flow of charge and discharge current.

A convex member 142b may be formed at the center of the vent plate 142. The convex member 142b may protrude in a downward direction. A sub-plate 147 may be attached at a bottom surface of the convex member 142b through, e.g., welding.

A cap lower 146 may be disposed between the vent plate 142 and the sub-plate 147. The cap lower 146 may have, e.g., a circular shape. The cap lower 146 may include a hole at a center thereof to order to insert the convex member 142b therein. An insulating member 145 may be disposed between the cap lower 146 and the vent plate 142. The insulating member 145 may insulate the cap lower 146 from the vent plate 142. The insulating member 145 may include a hole at a center thereof to insert the convex member 142b therein. Accordingly, the convex member 142b of the vent plate 142 may be easily joined with the sub-plate 147 through the holes.

The sub-plate 147 may be coupled to the convex member 142b and the cap lower 146, and the cap lower 146 may be electrically connected to the electrode assembly 110 through a lead member 150.

Current collected at the electrode assembly 110 may be transferred to the vent plate 142 through the lead member 150, the cap lower 146 and sub-plate 147, sequentially. The vent plate 142 may couple to the cap upper 143 to transfer current to the outer terminal 143a of the cap upper 143.

Figure 2:
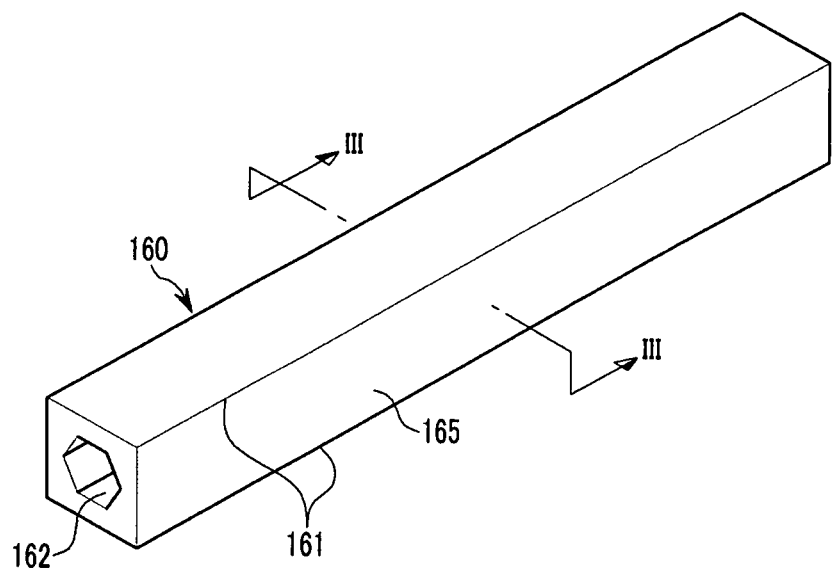
FIG. 2 illustrates a perspective view of a core of a rechargeable battery according to embodiment.
Figure 3:
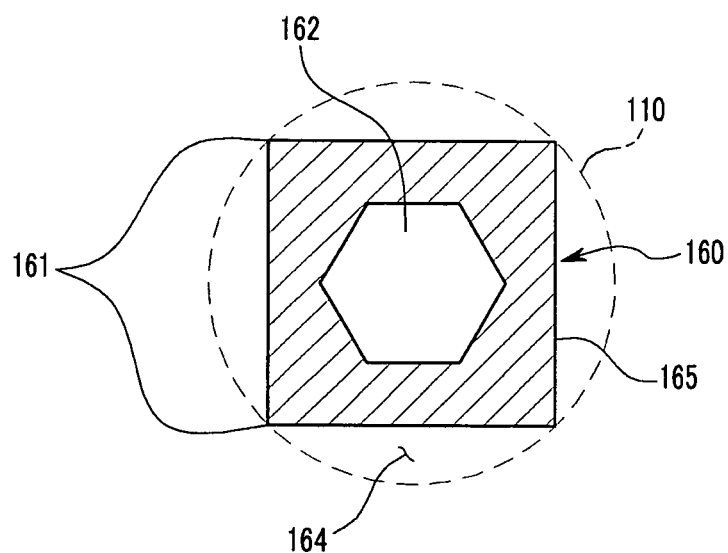
FIG. 3 illustrates a horizontal cross-sectional view of the core shown in FIG. 2 taken along the line III-III.

FIG. 2 illustrates a perspective view of a core of a rechargeable battery according to an embodiment. FIG. 3 illustrates a horizontal cross-sectional view of the core shown in FIG. 2 taken along the line III-III.

Referring to FIG. 2 and FIG. 3, the core 160 may have, e.g., a rectangular pillar shape. A hollow portion 162 may be formed inside the core 160. The hollow portion 162 may penetrate the core 160 along its length.

The hollow portion 162 may have a hexagon cross-section and may extend from one end of the core 160 to the other end. However, the embodiments are not limited thereto. The hollow portion 162 may have a cross-section formed in various suitable shapes, e.g., a polygonal shape, an oval shape, etc. The hollow portion 162 may provide a gas passage.

The core 160 having the rectangular pillar shape may include a support portion 161. An edge of the core 160 contacting the inner surface of the electrode assembly 110 may form the support portion 161. An outer surface of the core 160 may be planar, and portions thereof may be separated from an inner surface of the electrode assembly 110 to form an avoidance surface 165.

Accordingly, as shown in FIG. 3, a buffer space 164 may be formed between the avoidance surface 165 and the inner surface of the electrode assembly 110. The buffer space 164 may function as a buffer when the electrode assembly 110 expands.

During repeated charging and discharging, the electrode assembly 110 may gradually expand. Accordingly, the spiral-wound electrode assembly 110 may expand not only externally but also internally. However, since the core 160 may be disposed inside the electrode assembly 110 and may support the electrode assembly 110, the core 160 may contact the electrode assembly 110. Therefore, the positive electrode 112 and the negative electrode 113 inside the electrode assembly 110 may be compressed.

If stress is concentrated inside the electrode assembly 110 by the compression, the active material layers may be squeezed. As a result, the rechargeable battery may not be properly charged or discharged. Therefore, the output of the rechargeable battery 100 may deteriorate, and a life-span thereof may be shortened.

Since a space may be formed between the electrode assembly 110 and the case 120 according to an embodiment, it may be possible to prevent stress from being concentrated. In contrast, if no space is formed inside the electrode assembly 110, concentration of stress may seriously deteriorate the positive electrode 112 and the negative electrode 113. Therefore, overall performance of the rechargeable battery 100 may deteriorate.

However, if the core 160 is formed to have the rectangular pillar shape of an embodiment, only the support portion, which includes an edge of the rectangular pillar, may contact the inner surface of the electrode assembly 110. Therefore, the buffer space 164 may be formed between the avoidance surface 165 and the electrode assembly 110.

Since the electrode assembly 110 may expand in the buffer space 164, stress may be concentrated only at a part contacting with the support portion 161, and stress may be reduced at the other part by the buffer space 164. Accordingly, stress may be significantly reduced between the core 160 and the electrode assembly 110. The effects of the embodiments will be described in more detail, hereinafter.

Figure 4:
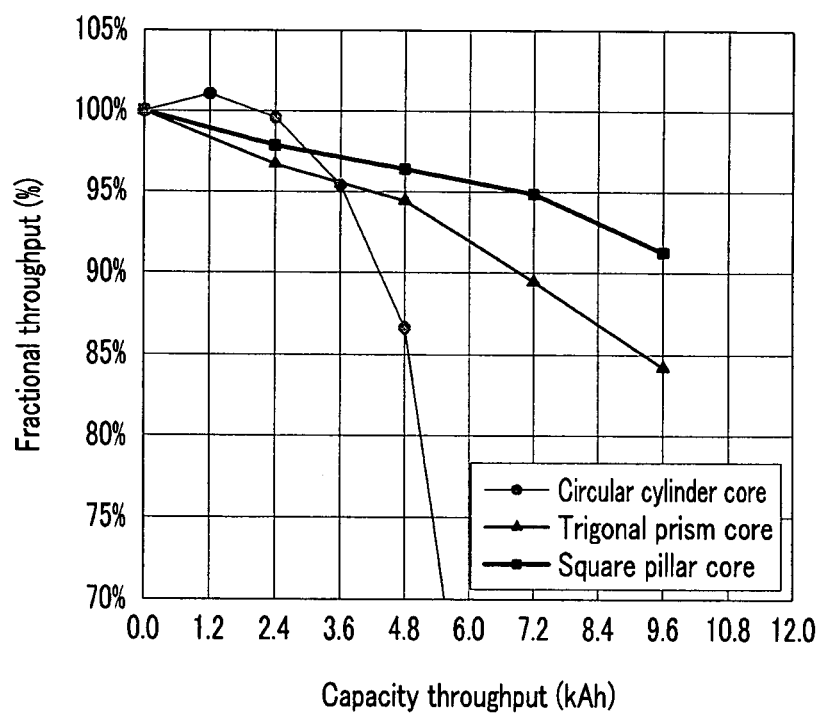
FIG. 4 illustrates a graph showing variation of fractional capacity according to capacity throughput of a rechargeable battery according to an embodiment.

FIG. 4 illustrates a graph showing variation of fractional capacity according to capacity throughput of a triangular (trigonal) pillar core, a rectangular (square) pillar core, and a comparative circular (cylindrical) pillar core.

The fractional capacity variation according to the capacity throughput is widely used to analyze a life-span of a rechargeable battery. Therefore, a detailed description thereof is omitted.

As illustrated in FIG. 4, the graph shows that the comparative circular pillar core has a fractional throughput that abruptly drops due to deterioration in the electrode assembly as the capacity throughput increases. On the contrary, the graph shows that decrease of fractional throughput of the triangular pillar core and the rectangular pillar core may be reduced because deterioration may be reduced in rechargeable batteries including the triangular pillar core and the rectangular pillar core.

As described above, the stress concentration may be significantly reduced in a rechargeable battery according to an embodiment. Therefore, it may be possible to overcome a problem of deterioration of the overall output of the rechargeable battery. Further, the life-span may be improved by preventing the deterioration of the rechargeable battery.

Figure 5A:
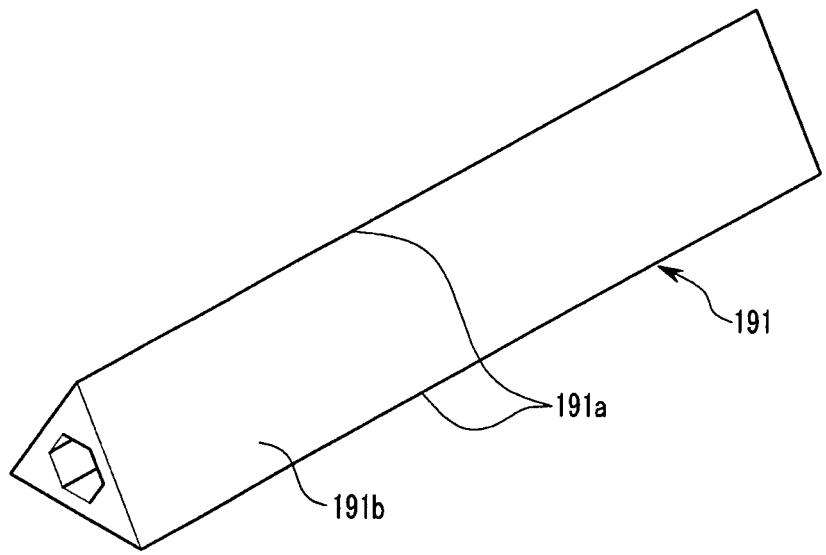
FIG. 5A to FIG. 5C illustrate perspective views of cores according to an embodiment.
Figure 5B:
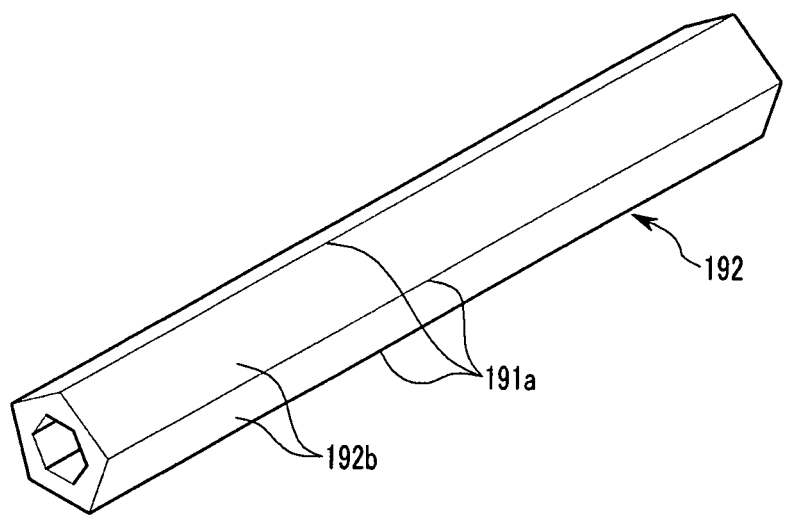
Figure 5C:
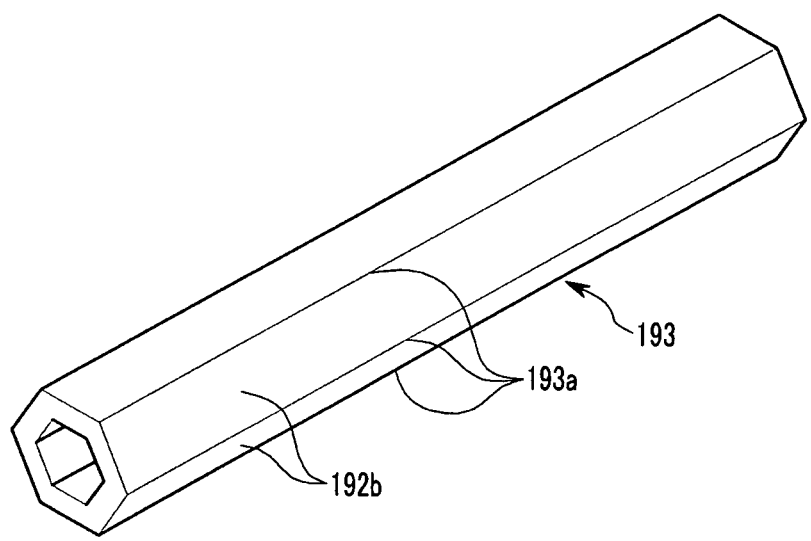

FIG. 5A to FIG. 5C illustrate perspective views of cores according to embodiments. Referring to FIG. 5A to FIG. 5C, a core may be formed not only in a rectangular pillar core but also in a polygonal pillar core. If the core is formed in a polygonal pillar shape, the edges of the pillar may function as a support portion and an external surface between the edges may function as an avoidance surface.

As shown in FIG. 5A, a core 191 may be formed in a triangular pillar shape.

Three support portions 191a and three avoidance surfaces 191b may be formed. As shown in FIG. 5B, a core 192 may be formed in a pentagonal pillar shape. Five support portions 192a and five avoidance surfaces 192b may be formed. As shown in FIG. 5C, a core 193 may be a hexagonal pillar shape. Six support portions 193a and six avoidance surfaces 193b are formed.

As the number of edges of the core increases, stress may be distributed through support portions. However, buffer space may be reduced. Therefore, it is preferable to use a polygonal core chosen according to the size and capacity of a rechargeable battery.

Figure 6:
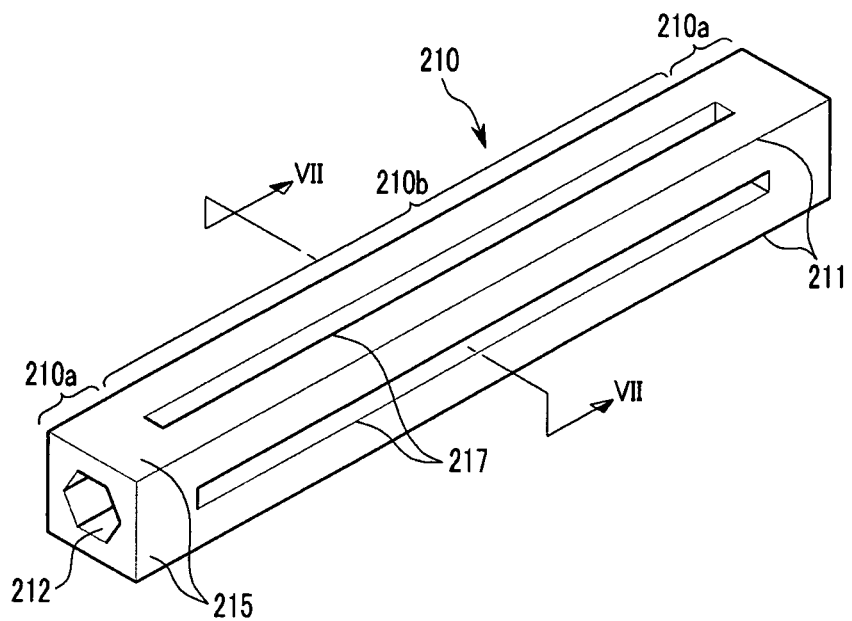
FIG. 6 illustrates a perspective view of a core of a rechargeable battery according to another embodiment.
Figure 7:
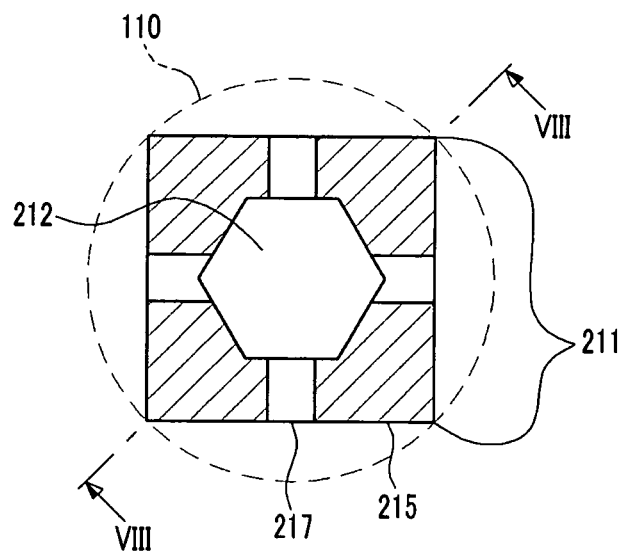
FIG. 7 illustrates a horizontal cross-sectional view of the core shown in FIG. 6 taken along the line VII-VII.

FIG. 6 illustrates a perspective view of a core of a rechargeable battery according to another embodiment. FIG. 7 illustrates a horizontal cross-sectional view of the core shown in FIG. 6 taken along the line VII-VII. Referring to FIG. 6 and FIG. 7, a core 210 according to the embodiment may have a rectangular pillar shape and a hollow portion 212 that penetrates the core 210 along its length.

The core 210 may include holes 217 penetrating an outer surface of the core 210 to the hollow portion 212. The holes 217 may extend along a length of the core, but not the entire length, i.e., both ends of the holes 217 may be disposed inward from ends of the core 210. The holes 217 may be centered along the length of the core 210. The holes 217 may be formed on the avoidance surface 215 to penetrate from the avoidance surface 215 to the hollow portion 212.

A plurality of holes 217 may be disposed at a predetermined interval along an external circumference of the core 210. For example four holes 217 may be arranged at a uniform interval along a circumference of the core 210. For example, one hole 217 may be formed at each avoidance surface 215. The number of holes 217 may be controlled according to the width and shape of the holes 217.

If the holes 217 are formed in the core 210 as described above, the core 210 may be elastically deformed due to the holes 217. Thus, the core 210 may be elastically deformed when the electrode assembly 110 pressurizes the core 210 due to expansion of the electrode assembly 110. Therefore, stress between the core 210 and the electrode assembly 110 may be advantageously reduced.

A section of the core 210 without holes 217 may have a large cross-section member 210a having a horizontal cross-sectional area larger than other parts of the core. The large cross-section member 210a may be formed at both ends of the core 210. An elastic deforming member 210b may be formed between the large cross-section members 210a. The elastic deforming member 210b may have a horizontal cross-section smaller than the horizontal cross-section of the large cross-section members 210a. The elastic deforming member 210b may be elastically deformed because the elastic deforming member 210b may have a smaller horizontal cross-section than the large cross-section member 210a due to the holes 217.

Figure 8:
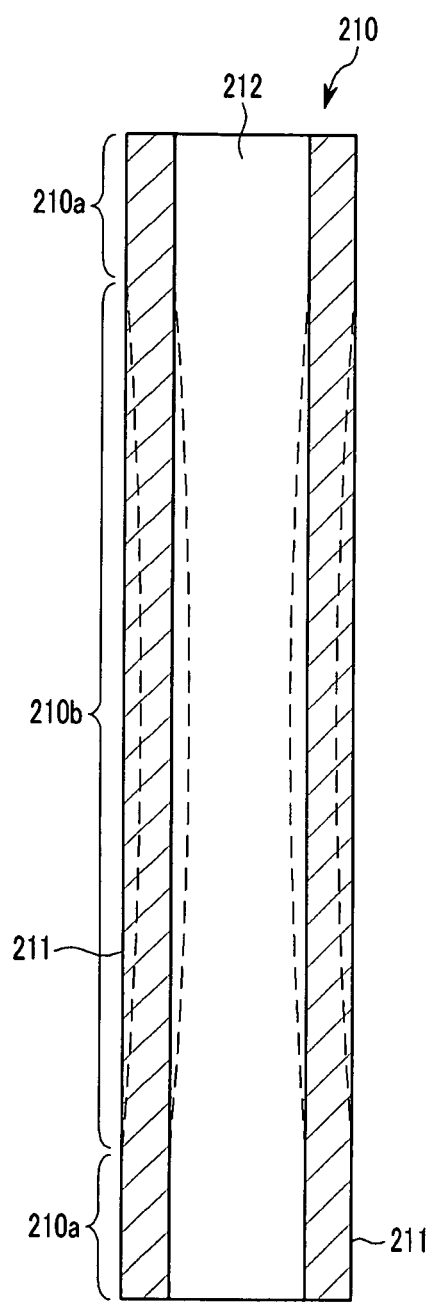
FIG. 8 illustrates a vertical cross-sectional view of the core shown in FIG. 7 taken along the line VIII-VIII.

As shown in FIG. 8, when the electrode assembly 110 expands, the elastic deforming member 210b may be deformed and bent inwardly, as shown by dashed lines. Since the center portion of the electrode assembly 110 may deform more than peripheral portions when the electrode assembly 110 expands, the elastic deforming member 210b according to an embodiment may allow the core 210 to deform according to the deformation of the electrode assembly 110. Therefore, it may prevent stress from excessively concentrating at the support portion 211.

A positive electrode current collecting plate 138 and a negative electrode current collecting plate 132 may be fixed at ends of the electrode assembly 110 through, e.g., welding. If the ends of the electrode assembly 110 were to deform inwardly due to deformation at the ends of the core 210, the electrode assembly 110 may separate from the current collecting plates 132 and 138. Therefore, the holes 217 may not extend all the way to ends of the core 210 in an embodiment in order to prevent the ends of the electrode assembly 110 from deforming.

Figure 9:
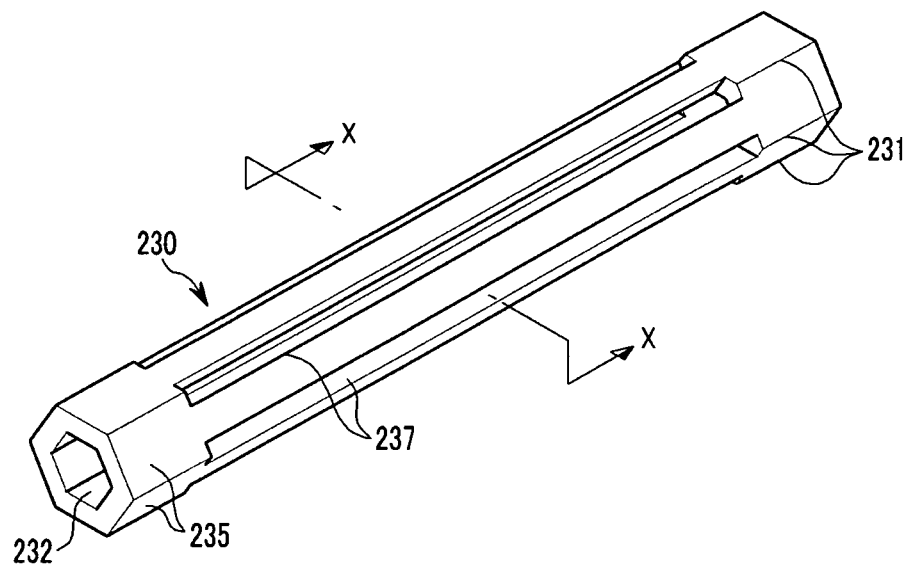
FIG. 9 illustrates a perspective view of a core of a rechargeable battery according to yet another embodiment.
Figure 10:
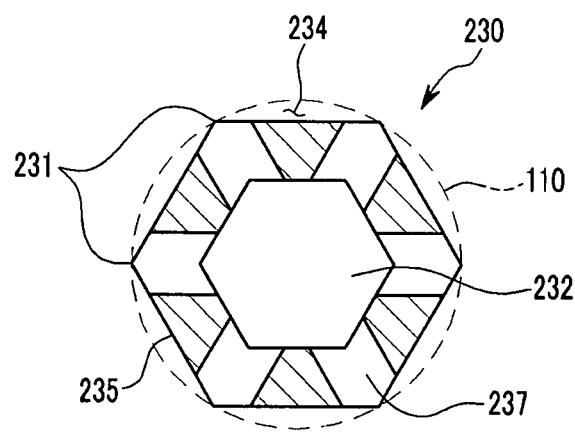
FIG. 10 illustrates a horizontal cross-sectional view of the core of FIG. 9 taken along the line X-X.

FIG. 9 illustrates a perspective view of a core of a rechargeable battery according to another embodiment. FIG. 10 illustrates a horizontal cross-sectional view of the core of FIG. 9 taken along the line X-X. Referring to FIG. 9 and FIG. 10, a core 230 according to the embodiment may have a hexagon pillar shape and may include a hollow portion 232 that penetrates the core 230 along its length.

The core 230 may include support portions 231 including edges and avoidance surfaces 235 including surfaces between the support portions 231. Holes 237 may be formed at each edge of the core 230. The holes 237 may penetrate from an outer side of the core 230 to the hollow portion 232.

The holes 237 may extend along a length of the core 230. The holes 237 may not extend along the entire length of the core 230, i.e., both ends of the holes 237 may be disposed inward from the ends of the core 230. Preferably, the holes 237 are centered along a length of the core 230.

Portions with the holes 237 may not contact the electrode assembly 110. That is, the support portion 231 may not be formed where the core 230 includes the holes 237. The support portions 231 may be formed only at the ends of the core 230. Therefore, stress may be generated only at the ends of the electrode assembly 110. Thus, the stress may be minimized at inner portions of the electrode assembly 110. The holes 237 of the core 230 may allow the core 230 to be elastically deformed. Therefore, the stress between the core 230 and the electrode assembly 110 may be further reduced.

Figure 11:
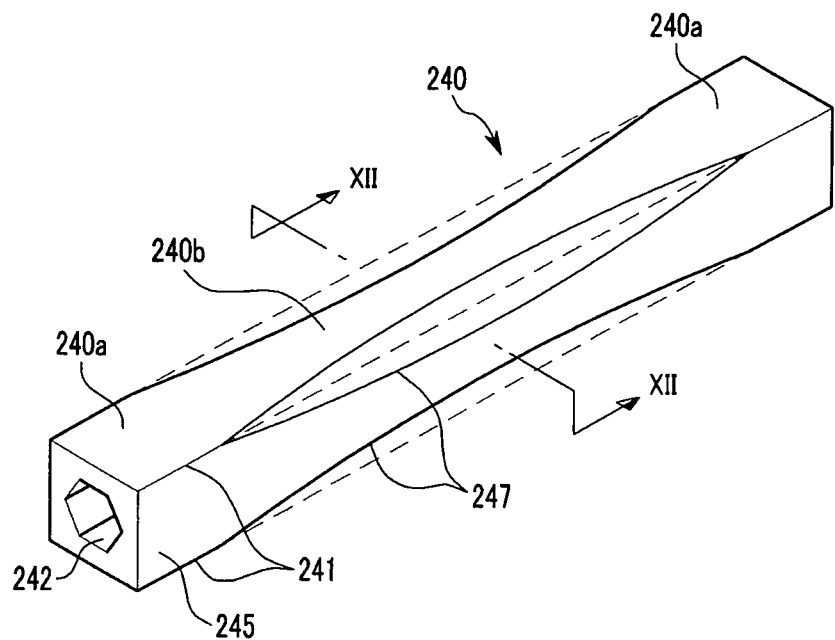
FIG. 11 illustrates a perspective view of a core of a rechargeable battery according to yet another embodiment.
Figure 12:
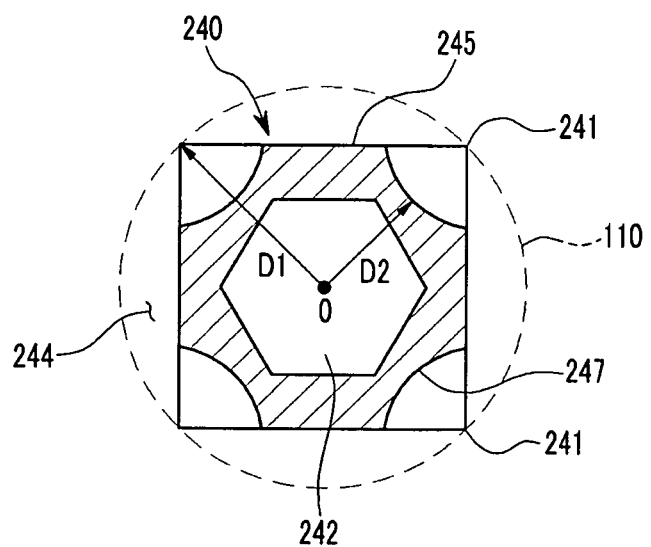
FIG. 12 illustrates a horizontal cross-sectional view of the core of FIG. 11 taken along the line XII-XII.

FIG. 11 illustrates a perspective view of a core of a rechargeable battery according to yet another embodiment. FIG. 12 illustrates a horizontal cross-sectional view of the core of FIG. 11 taken along the line XII-XII.

A core 240 according to the embodiment may have a rectangular pillar shape and may include a hollow portion 242 penetrating the core 240 along its length. The core 240 may include support portions 241 including edges of the core 240 and avoidance surfaces 245 including surfaces between the edges. The support portions 241 may be formed at both ends of the core 240 and recess portions 247 may be formed between the support portions 241 along the length of the core 240. The recess portions 247 may be formed by, e.g., cutting off the edges of the core 240. Thus, the recess portions 247 may be formed by cutting off a center portion of the edge, shown by dashed lines, with both ends of the edge remaining on the core 240. The recess portions 247 may form a trench structure in an arc toward an inner side of the core 240. If a distance D1 denotes a distance from a center axis 0 of the core 240 to the support portion 241 and a distance D2 denotes a distance from the center axis 0 to the recess portion 247, as shown in FIG. 12, the distance D1 may be longer than the distance D2. Since the recess portion 247 may have an arc shape, the distance D2 may gradually decrease along a length of the core 240 from an outer end to a center.

The recess portion 247 at the edge of the core 240 according to the embodiment may make the core 240 contact the electrode assembly 110 only at the support portions 241 at ends of the core 240. Therefore, it may be possible to minimize stress between the core 240 and the electrode assembly 110. Since a buffer space 244 may also be formed between the recess portion 247 and the electrode assembly 110, stress may be further minimized by accommodating the expanding electrode assembly 110. Accordingly, the life-span of a rechargeable battery may be improved by preventing deterioration of the electrode assembly 110. Deterioration of power output of the rechargeable battery may also be reduced.

Figure 13:
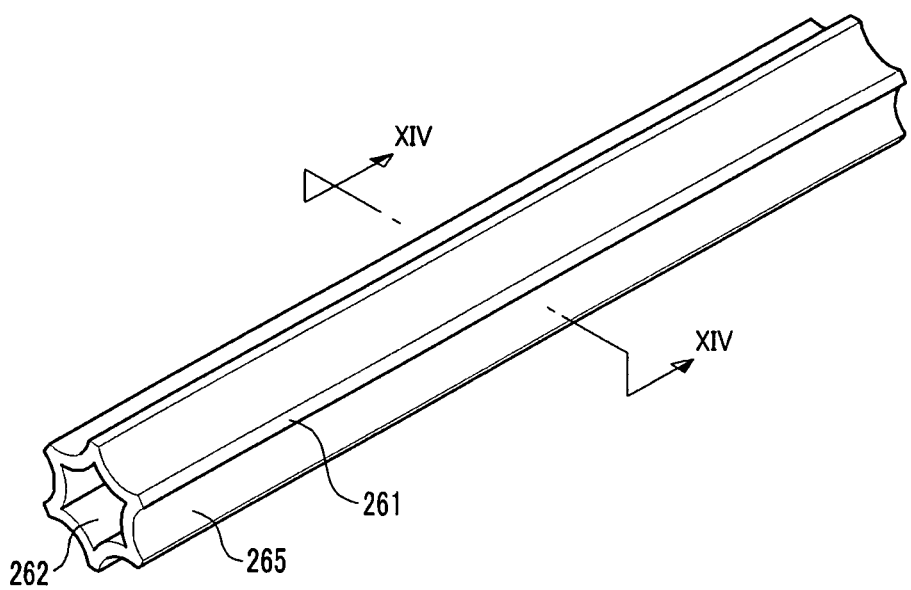
FIG. 13 illustrates a perspective view of a core of a rechargeable battery according to still another embodiment.
Figure 14:
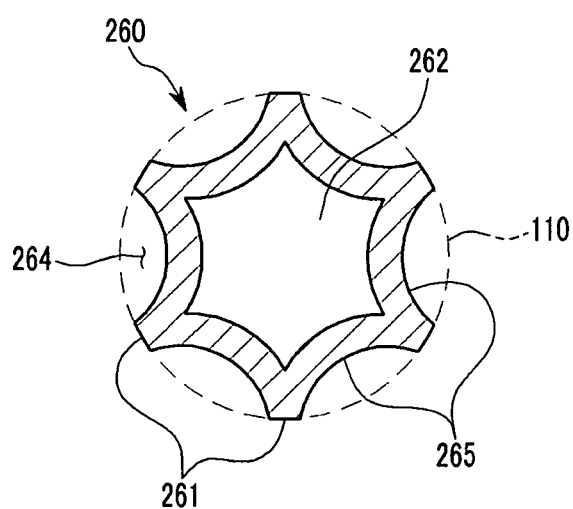
FIG. 14 illustrates a horizontal cross-sectional view of the core of FIG. 13 taken along the line XIV-XIV.

FIG. 13 illustrates a perspective view of a core of a rechargeable battery according to still another embodiment. FIG. 14 illustrates a horizontal cross-sectional view of the core of FIG. 13 taken along the line XIV-XIV. Referring to FIG. 13 and FIG. 14, the core 260 according to the embodiment may have a pillar shape and may include a hollow portion 262 penetrating the core 260 along its length.

An outer surface of the core 260 may have an arc shape and may include support portions 261 having a rounded outer surface and avoidance surfaces 265 having an inwardly curved surface curved away from an inner surface of the electrode assembly and toward an inner side of the core 260. The support portions 261 may have a rounded outer surface. Curvature of the rounded outer surface of the support portions 261 may be identical to the curvature of an inner circle formed by an inner side surface of the electrode assembly 110.

Although a contact area of the rounded support portions 261 and the electrode assembly 110 may increase compared to an edge, stress generated between the support 261 and the electrode assembly 260 may not be great because the electrode assembly 110 may expand in a space formed between the electrode assembly 110 and the avoidance surfaces 265. If the support portion 261 is an edge, stress may be concentrated because the electrode assembly 110 and the support portion 261 contact each other along a line. However, if the support portion 261 is curved, the electrode assembly 110 and the support portion 261 contact each other along a curved surface. Therefore, the stress may be distributed.

Since the avoidance surface 265 may be curved toward a center of the core 260, it may be possible to form a buffer space 264 wider than an avoidance surface formed in a plane. Therefore, since a space for accommodating the expanded electrode assembly 110 may become wider, it may be possible to further reduce stress between the electrode assembly 110 and the core 260. For this purpose, an inner side of the hollow portion 262 may be curved toward a center of the core 260. Therefore, it may be possible to increase curvature of the avoidance surface 265 by forming the hollow portion 262 to be curved as much as the curved avoidance surface 265.

A method of manufacturing a rechargeable battery according to an embodiment may include forming an electrode assembly having an inner surface and including a positive electrode, a negative electrode, and a separator interposed therebetween, providing the electrode assembly in a case having a space for internally housing the electrode assembly, coupling a cap assembly to the case and electrically connected to the electrode assembly, and providing a core inside the electrode assembly, wherein the core has a length and includes a plurality of support portions contacting the inner surface of the electrode assembly, and a plurality of avoidance surfaces between the support portions and separated from the inner surface of the electrode assembly. Due to the support portions and the avoidance surfaces of the core, the core may contact the electrode assembly only at the support portions and a buffer space may be formed between the avoidance surface and the electrode assembly. Therefore, stress may be concentrated only at the support portions when the electrode assembly expands, and the avoidance surface may form a buffer space to house expansion of the electrode assembly. Accordingly, it may be possible to minimize deterioration of the electrode assembly caused by concentration of stress. As a result, it may be possible to prevent reduction of output of the rechargeable battery and to improve life-span of the rechargeable battery.

Also, holes formed on the avoidance surfaces may allow the core to be elastically deformed. Therefore, it may be possible to reduce stress caused by expansion of the electrode assembly. Further, concentration of stress may be prevented through forming support portions at both ends of the core and holes between support portions and forming a recess portion.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope as set forth in the following claims.

What is claimed is:

1. A rechargeable battery, comprising:
    an electrode assembly having an inner surface and including a positive electrode, a negative electrode, and a separator interposed therebetween;
    a case having a space for internally housing the electrode assembly;
    a cap assembly coupled to the case and electrically connected to the electrode assembly; and
    a core inside the electrode assembly, wherein the core has a length and includes:
        a plurality of support portions contacting the inner surface of the electrode assembly, and
        a plurality of avoidance surfaces between the support portions and separated from the inner surface of the electrode assembly,
    wherein:
    the core has two ends,
    large cross-section members each having a large horizontal cross-section are at both ends of the core,
    an elastic deforming member, having a horizontal cross-section smaller than the horizontal cross-section of the large cross-section members, extends along a lengthwise direction of the core between the large cross-section members, and
    the core has a monolithic structure.

2. The rechargeable battery as claimed in claim 1, further comprising a buffer space between the avoidance surfaces and the inner surface of the electrode assembly.

3. The rechargeable battery as claimed in claim 1, wherein the core includes a hollow portion penetrating the core along its length.

4. The rechargeable battery as claimed in claim 1, wherein the core has a polygonal pillar shape.

5. The rechargeable battery as claimed in claim 4, wherein the core has outer edges and surfaces between the outer edges, the support portions include the outer edges of the core and the avoidance surfaces include the surfaces between the outer edges.

6. The rechargeable battery as claimed in claim 1, wherein the avoidance surfaces are planar.

7. The rechargeable battery as claimed in claim 1, wherein the support portions include a curved surface in contact with the inner surface of the electrode assembly.

8. The rechargeable battery as claimed in claim 1, wherein the support portions are at ends of the core, the avoidance surfaces include recess portions and the recess portions are disposed along the length of the core between the support portions.

9. The rechargeable battery as claimed in claim 8, wherein the core includes a center axis and a distance from the center axis of the core to the recess portions is shorter than a distance from the center axis of the core to the support portions.

10. The rechargeable battery as claimed in claim 8, wherein the core has a center axis, and a distance from the recess portions to the center of the core decreases from an end of one of the recess portions toward a center of the recess portion.

11. The rechargeable battery as claimed in claim 1, wherein the avoidance surfaces include a hole extending along a length of the core.

12. The rechargeable battery as claimed in claim 1, wherein:
   support portions are disposed at both ends of the core, and
   a hole extends along the lengthwise direction of the core between the support portions.

13. The rechargeable battery as claimed in claim 1, wherein the electrode assembly has a spiral shape.

14. The rechargeable battery as claimed in claim 1, wherein the case has a cylinder shape.

* * * * *